No. 707,213. Patented Aug. 19, 1902.
G. H. DICKERSON & J. M. GORDON.
METHOD OF MOLDING SPOKE WHEELS AND THE PRODUCT THEREOF.
(Application filed May 28, 1902.)
(No Model.) 2 Sheets—Sheet 1.
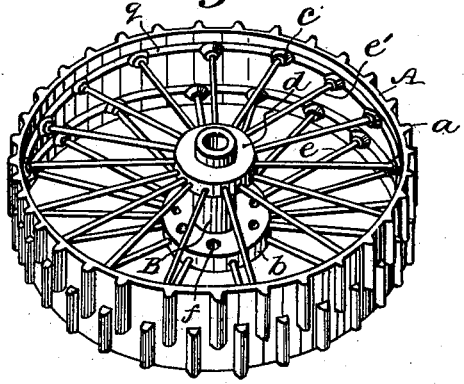
Fig. 1.
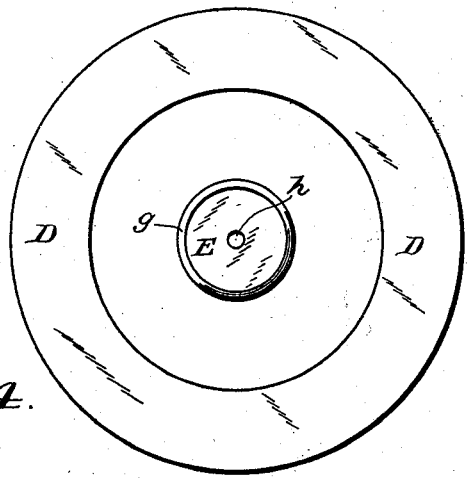
Fig. 2.
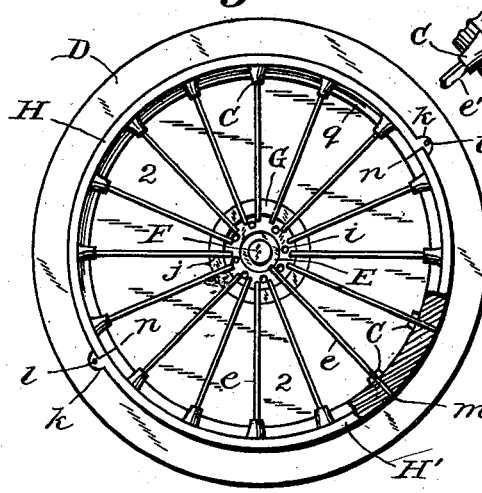
Fig. 3.
Fig. 4.
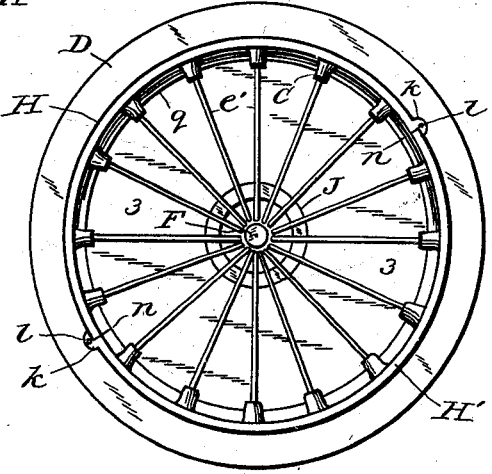
Fig. 5.
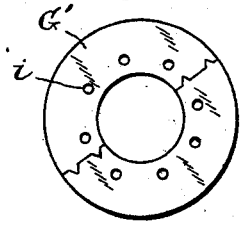
Fig. 6.
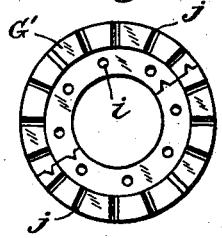
Fig. 7.
Fig. 8.
WITNESSES:
Dow W. Vorhies.
Stella Snider.
INVENTORS:
G. H. Dickerson,
J. M. Gordon.
BY
ATTORNEY.
THE NORRIS PETERS CO., PHOTO-LITHO., WASHINGTON, D. C.

No. 707,213. Patented Aug. 19, 1902.
G. H. DICKERSON & J. M. GORDON.
METHOD OF MOLDING SPOKE WHEELS AND THE PRODUCT THEREOF.
(Application filed May 28, 1902.)
(No Model.) 2 Sheets—Sheet 2.
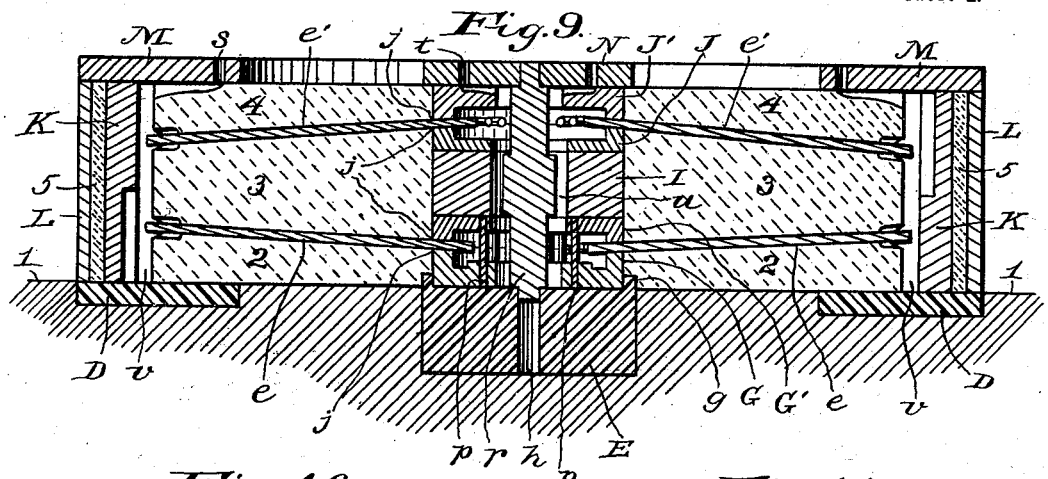
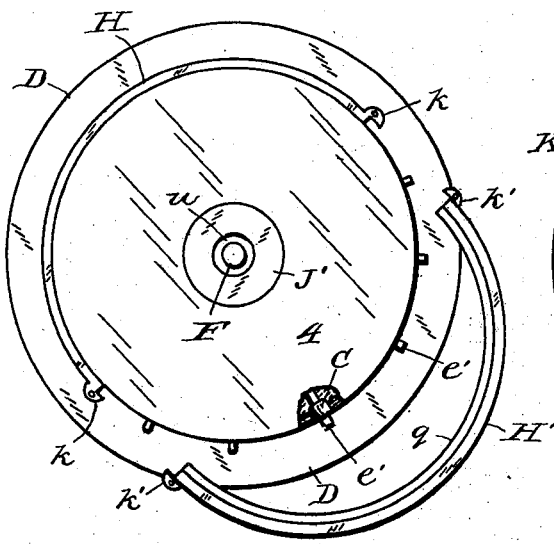
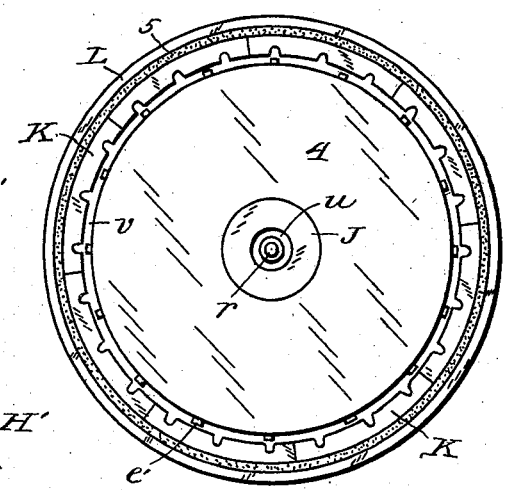
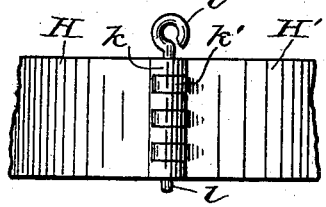
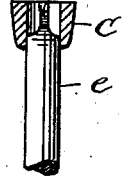
WITNESSES:
Dow W. Vorhies.
Stella Snider.
INVENTORS:
G. H. Dickerson,
J. M. Gordon.
BY
E. T. Silvius.
ATTORNEY.

UNITED STATES PATENT OFFICE.

GEORGE H. DICKERSON AND JOHN M. GORDON, OF COLUMBUS, INDIANA.

METHOD OF MOLDING SPOKE-WHEELS AND THE PRODUCT THEREOF.

SPECIFICATION forming part of Letters Patent No. 707,213, dated August 19, 1902.

Application filed May 28, 1902. Serial No. 109,265. (No model.)

*To all whom it may concern:*

Be it known that we, GEORGE H. DICKERSON and JOHN M. GORDON, citizens of the United States, residing at Columbus, in the county of Bartholomew and State of Indiana, have invented a new and useful Method of Molding Spoke-Wheels and the Product Thereof; and we do declare the following to be a full, clear, and exact description of the invention, reference being had to the accompanying drawings, and to the characters of reference marked thereon, which form a part of this specification.

Our invention relates to a method of molding in sand for casting wheels having wrought spokes, and has particular reference to driving-wheels for portable engines and the like vehicles, the hubs and rims of which are cast-iron and the spokes of which are formed either of rolled bar-iron or of bar-steel or of tubing laid in the mold, and the rims and the hubs cast upon them. Our object is to mold such wheels as above described in a simple manner in order principally to save time and labor in the operation, and consequently cheapen the output of the foundry, and specific objects are to avoid the use of parted flasks and molds and also avoid the labor of handling them in molding the wheels and to provide wheels as described that shall contain when finished the spokes that were parts of the patterns, so that the time and labor of placing the spokes in the mold after removing the pattern, as heretofore done, may be avoided.

Our invention consists in the method of building up the molds and inserting the patterns and the spokes and the product thereof, as hereinafter particularly described and claimed.

In order to fully explain the various steps in the method, we illustrate them in connection with suitable means whereby the desired results are attained in the accompanying drawings, in which—

Figure 1 represents a perspective view of a wheel constructed according to our method; Fig. 2, a plan view of parts of the means usually employed in carrying out our method; Fig. 3, a plan view of the mold in its first stage, in which parts of the pattern are shown, a portion of the rim-pattern being broken away; Fig. 4, a fragmentary view of a portion of the rim-pattern; Fig. 5, a plan view of the mold in an advanced stage of formation; Fig. 6, a top plan view of the upper half of the lower portion of the hub chill or core; and Fig. 7 is a bottom plan view of the same, also representing the upper plan of the lower half of the same portion of the hub; Fig. 8, a top plan view of the chill or core for the middle portion of the hub; Fig. 9, a transverse vertical sectional view of the complete mold ready for pouring the metal thereinto; Fig. 10, a top plan view of the mold when nearly completed, showing part of the rim-pattern as when being removed from the mold; Fig. 11, a top plan view of the mold as when nearly completed before applying the top plate; Fig. 12, a fragmentary detail view of the rim-pattern; Fig. 13, a detail view of a spoke end and boss-pattern, and Fig. 14 an end view of a spoke in the boss-pattern.

In the drawings similar reference characters indicate corresponding parts throughout.

In molding a wheel according to our method and in obtaining the product thereof we proceed substantially in the following manner step by step and usually employ substantially the agencies described hereinafter.

Our description for the purposes of the specification applies to a wheel comprising a broad cast-iron rim A, having cleats $a$, a cast-iron hub B, having flanges $b$ and $d$, bosses $c$ at the inner side of the rim A, wrought spokes $e\ e'$, extending into the bosses and into the hub-flanges, the flange $b$ being described herein as the lower flange or lower portion of the hub, as seen in the illustrations and also as cast, but which when in use will be the inner end of the hub to which the driving gear-wheel may be bolted, the bolts to extend through the holes $f$ in the flange. Usually ribs $g$ are also cast at the inner side of the rim A in line with the bosses $c$, all of which are of common form. The spokes, however, may be crossed near the flanges, if preferred. The outer face of the rim A is usually chilled, and by our method we may also conveniently chill the sides or edges of the rim, which will be an advantage in preventing the edges from wearing off in use. We may also chill the exterior of all or of parts of the hub without extra trouble or expense. As a preliminary step in the method we sink or bed an annular iron plate D in the earthen floor 1 of the foundry, the upper face of the plate being a plane even with the floor-surface and broad enough to accommodate wheels of several different diameters, and a smaller but thicker iron plate E is likewise bedded in the floor at the center of the plate D. The plate E has an annular flange $g$ on its upper face, and preferably has also a central aperture $h$. Once these plates are placed in the floor they may so remain permanently as parts of later molds. Succeeding steps comprise the placing of the rim-pattern upon the plate D and the under half G of the pattern or mold for the lower end portion of the hub upon the plate E, and then a center post F may be set upon the plate E and extend into the center aperture $h$. The rim-pattern is to form the mold for only the inner face of the wheel-rim and the ribs thereon and is formed of two or more parts, as H and H', matched or jointed together, as at $n n$, and detachably coupled, as by means of ears $k$ and removable pins $l$. The rim-pattern is as high upon the plate D as the wheel-rim is to be made in width of face. Obviously it is immaterial which one of the parts—the rim-pattern, the hub-pattern G, or the post F—is placed first, as all may be placed simultaneously. By means of a tram or a gage the rim-pattern is then set central with the center post, and as the pattern G is designed to fit into the flange $g$ it will be central with the post and also the rim-pattern. The pattern or mold G will be first made to conform to any desired shape of hub end desired and will extend up to the plane of the centers of the lower set of spokes, and it may be either in the form of a sand core or a metallic chill-mold, and if metallic it may be halved. Its upper face has radiating grooves $j$ therein and also holes $i$, in which to place cores $p$ for forming the bolt-holes $f$. The rim-pattern has holes $m$ to receive the ends of the spokes $e$, having flattened extremities $w$, and the holes $m$ may be large enough to receive the boss-patterns C, the holes extending through the ribs $q$, or the bosses may be designed to set against the ribs, but are not attached thereto. The boss-patterns each have a central hole adapted to receive the body part of the spoke and also slots $y$ at the sides of the holes to receive the broad flattened parts $w$. The lower set of spokes may now be provided each with a boss-pattern C and the flattened end thereof be inserted in the hole $m$, while the other end is to be laid in a groove $j$, and then the first portion of sand 2 is to be put in between the rim-pattern and the lower hub pattern or chill and rammed, the boss-patterns being tucked up against the rim-pattern, the sand being brought up to the top of the hub part G and to the spokes or somewhat higher, if it may so happen. The next step is to set the upper pattern G' for the other part of the flange $b$ upon the part G, the two parts preferably being suitably matched or jointed, as by dowels or otherwise, so as to be true to the axis.

The pattern G' is halved if metallic, as a chill, so that it may be removed from the cast hub, and if made of baked sand it should also be halved, and it has also holes $i$ to support the cores $p$, and its lower face has grooves $j$ to receive the spoke end portions, and thus hold them in place. The halved hub-chill I may now be set upon the pattern G', and then the pattern J, that forms part of the hub and the lower part of the flange $d$ or upper portions of the hub, may be placed upon the chill I. Next the upper set of spokes $e'$ are provided each with a boss-pattern C and set into the holes $m$ and the grooves $j$. Now additional sand 3 may be put in, as before, and rammed upon the sand 2 without any parting whatever and brought up to the upper spokes, or this sand may be put in just before setting the upper spokes, as will be obvious. Now or just before all the sand 3 is put in the molder should reach into the hub-patterns and draw the spokes $e$ toward the center of the hub sufficiently to withdraw the spokes from the holes $m$ in the rim-pattern, as one spoke is shown in Fig. 3, the sand mold now holding the spokes in place. Following this step the upper part J' of the pattern for the upper portion of the hub is to be placed upon the part J, the two parts J and J' having the grooves $j$ in their joint faces to receive the spokes, as before described. The boss-patterns C are to be tucked up against the rim-pattern, while the balance of the sand 4 is to be put in and rammed also without any parting from the wet sand below. The sand is to be brought up level with the top of the patterns. Now the upper spokes $e'$ should be drawn in toward the hub center, so as to clear the rim-pattern, the positions of the spokes as they would now appear being indicated in Fig. 5, in which it is assumed that the spokes have not yet been covered with the sand; but the mold would, in fact, appear somewhat as indicated in Fig. 10. Next in order the rim-pattern parts H H' are to be disconnected by first removing the pins $l l$ and then drawing the parts laterally away from the sand mold, as the part H' is shown in Fig. 10, after which the boss-patterns C are to be removed from the ends of the spokes and the spokes drawn outwardly, as some are shown in Fig. 10, so as to project from the mold of sand. The rim-chills K may now be set up on the plate D and gaged either from the post F or from the sand mold, and thus be set accurately, so that the cast rim will be of uniform thickness. A band L is to be set also upon the plate D, either before or after setting the chills K, and it extends entirely about the chills a short distance from them, and dry sand 5 is to be placed between the chills and the rim for the purpose of holding the chills in their proper positions and also permitting expansion of the chills. To complete the mold, a suitable plate M is now placed upon the chills K and also extending upon the sand mold. The post F will be removed and the hub-core $r$ inserted in the center of the hub patterns or chills, and then a suitable plate N is to be placed upon the hub-pattern J', and suitable gates s and t having been provided the metal may now be poured into the mold, so as to fill the spaces u to form the hub and v to form the rim, both of which are thus cast to the spokes that formed parts of the pattern in molding the wheel.

It will thus be seen that by our method much time and labor are saved in molding each wheel, since there are no partings to be made, and it will be apparent that the product comprises portions that are transformed from spoke-patterns to the wheel-spokes and cast into the solid portions of the rim and the hub.

Having thus described our invention, what we claim is—

1. The art of molding spoke-wheels, which consists in forming a non-parting green or damp sand mold within the confines of a rim-pattern having ribs at the inner side thereof and adapted to be parted transversely of the rim, placing boss-patterns loosely upon separate spokes and setting the spokes at the ribs of the rim-pattern and also setting the boss-patterns against the ribs of the rim-pattern while forming the mold, setting up sectional prepared molds or patterns for the hub while forming the green-sand mold, parting the rim-pattern and withdrawing the same outwardly as from its axis from the green-sand mold, removing the boss-patterns from the spokes and also from the green-sand mold, and setting a separate mold about the green-sand mold, substantially as described.

2. The art of molding spoke-wheels, which consists in forming a non-parting green-sand mold within the confines of a rim-pattern having holes therein to receive the ends of the spoke-patterns, setting the spoke-patterns in the holes in the rim-pattern while forming the mold, drawing the spoke-patterns longitudinally from the holes in the rim-pattern after forming the sand mold, withdrawing the rim-pattern from the sand mold, drawing the spoke-patterns oppositely to their former movements, and setting a separate mold about the green-sand mold, substantially as described.

3. The art of molding spoke-wheels, which consists in setting a rim-pattern and a pattern for the lower end of the hub, placing separate spoke-patterns in connection with the rim and the hub patterns, setting companion hub-patterns, placing other separate spoke-patterns in connection with the rim and the companion hub patterns, gaging and adjusting the rim-pattern relatively to the hub-patterns, forming a green-sand mold between the rim-pattern and the hub-patterns, drawing the spoke-patterns longitudinally toward the axis of the hub-patterns, drawing the rim-pattern outwardly as from its axis from the sand mold, setting the mold for the outer face of the rim, and setting a plate-cover upon the mold, substantially as described.

4. The art of making spoke-wheels, which consists in setting a sectional rim-pattern and also a separated sectional hub-pattern, placing boss-patterns loosely upon separate spoke-patterns and setting the spoke-patterns in connection with the rim and the hub patterns, setting the boss-patterns against the rim-pattern, forming a sand mold without a parting, shifting the spoke-patterns longitudinally, removing the rim-pattern from the mold without disturbing the hub-pattern, shifting the spoke-patterns, removing the boss-patterns from the spoke-patterns and also from the mold, setting a pattern for the outer face of the rim, and pouring the metal between two separate plates to form the sides of the rim, substantially as described.

5. The art of making spoke-wheels, which consists in building up a sectional hub-exterior pattern, setting a sectional rim-pattern of full width of face, setting spoke-patterns separately in connection with the hub and the rim patterns, forming a non-parting solid green-sand mold, shifting the spoke-patterns inwardly, removing the rim-pattern without disturbing the hub-pattern, shifting the spoke-patterns outwardly, setting the rim-face chills, setting a band concentrically about the rim-face chills, placing dry sand between the rim-face chills and the band, setting opposing chill-plates so as to form the sides of the rim, casting the metal between the opposing chill-plates and also within the hub exterior pattern, and then removing the chills and the hub-pattern and the sand mold, leaving the spoke-patterns attached to the castings.

6. The art of molding spoke-wheels having ribs at the inner face of the rim, which consists in setting a rim-pattern having ribs thereon and a pattern for the lower end of the hub, placing separate spokes in connection with the hub-pattern and also with the rim-pattern at the ribs, setting boss-patterns loosely on the spokes against the rim-ribs, setting companion hub-patterns, placing other spokes in connection with the rim-ribs and the hub-patterns, forming a green-sand mold between the rim-pattern and the hub-patterns, parting the rim-pattern transversely thereof and drawing the parts thereof outwardly as from its axis away from the peripheral face of the sand mold, removing the boss-patterns from the mold, and setting the mold for the outer face of the wheel-rim, substantially as described.

In testimony whereof we affix our signatures in presence of two witnesses.

GEORGE H. DICKERSON.
JOHN M. GORDON.

Witnesses:
BEN BLOCH,
M. D. EMIG.